United States Patent
Kadoya et al.

(10) Patent No.: US 10,035,221 B2
(45) Date of Patent: Jul. 31, 2018

(54) METAL BONDED PRODUCT AND METHOD FOR PRODUCING METAL BONDED PRODUCT

(71) Applicant: ORIGIN ELECTRIC COMPANY, LIMITED, Saitama (JP)

(72) Inventors: Yasuo Kadoya, Saitama (JP); Hironobu Nishimura, Saitama (JP)

(73) Assignee: ORIGIN ELECTRIC COMPANY, LIMITED, Saitama (JP)

( * ) Notice: Subject to any disclaimer, the term of this patent is extended or adjusted under 35 U.S.C. 154(b) by 0 days.

(21) Appl. No.: 15/504,847

(22) PCT Filed: Aug. 3, 2015

(86) PCT No.: PCT/JP2015/071967
§ 371 (c)(1),
(2) Date: Feb. 17, 2017

(87) PCT Pub. No.: WO2016/027650
PCT Pub. Date: Feb. 25, 2016

(65) Prior Publication Data
US 2017/0266763 A1  Sep. 21, 2017

(30) Foreign Application Priority Data
Aug. 18, 2014 (JP) ................ 2014-165648

(51) Int. Cl.
*B23K 33/00* (2006.01)
*B23K 11/093* (2006.01)
*B23K 101/00* (2006.01)

(52) U.S. Cl.
CPC .......... *B23K 33/006* (2013.01); *B23K 11/093* (2013.01); *B23K 33/008* (2013.01); *B23K 2201/006* (2013.01)

(58) Field of Classification Search
CPC ... B23K 33/006; B23K 33/008; B23K 11/093
(Continued)

(56) References Cited

U.S. PATENT DOCUMENTS 4,789,912 A * 12/1988 Masuda ............. G11B 15/6656
360/85
5,296,061 A * 3/1994 Ando ................... B01D 39/083
156/169
(Continued)

FOREIGN PATENT DOCUMENTS

DE   102010027604 A1   2/2011
JP       62156088 A    7/1987
(Continued)

OTHER PUBLICATIONS

International Search Report for PCT Application No. PCT/JP2015/071967, dated Oct. 20, 2015, translation, 2 pp.

*Primary Examiner* — Eric Stapleton
(74) *Attorney, Agent, or Firm* — Squire Patton Boggs (US) LLP

(57) ABSTRACT

To provide a metal bonded product wherein a large bonding area can be provided to achieve high bonding strength and coaxial accuracy can be easily achieved needing no positioning jig. A first taper portion 16 is formed on a side wall surface of the opening 13 of the ring-shaped metal member 12, and multiple step-shaped bonding surfaces are formed thereon. An end of the cylindrical portion 11 has a second taper portion 17 with the same chamfer angle as that of the first taper portion 16 of the ring-shaped metal member 12. The ring-shaped metal member 12 and the cylindrical metal member 11 are bonded to each other by press-fitting the cylindrical portion of the cylindrical metal member 11 in the opening 13 of the ring-shaped metal member 12 while applying a current to cause the side wall portion of the cylindrical portion of the cylindrical metal member 11 and (Continued)

the multiple step-shaped bonding surfaces of the first taper portion 16 to undergo plastic flow.

4 Claims, 4 Drawing Sheets

(58) Field of Classification Search
 USPC .................................................. 219/78.16
 See application file for complete search history.

(56) References Cited

U.S. PATENT DOCUMENTS

| | | | | |
|---|---|---|---|---|
| 5,586,530 A * | 12/1996 | Adachi | ............... | F01L 3/22 123/188.3 |
| 5,649,358 A * | 7/1997 | Adachi | ............... | F01L 3/22 29/888.4 |
| 5,687,685 A * | 11/1997 | Amano | ............... | F01L 1/265 123/188.8 |
| 5,692,726 A * | 12/1997 | Adachi | ............... | B22F 7/062 123/188.3 |
| 5,742,020 A * | 4/1998 | Adachi | ............... | F01L 3/22 219/118 |
| 5,761,806 A * | 6/1998 | Adachi | ............... | F01L 3/22 29/888.44 |
| 5,765,520 A * | 6/1998 | Adachi | ............... | F01L 3/22 123/188.8 |
| 5,768,779 A * | 6/1998 | Adachi | ............... | F01L 3/22 123/188.8 |
| 5,778,531 A * | 7/1998 | Inami | ............... | B23K 33/006 123/188.8 |
| 5,794,337 A * | 8/1998 | Adachi | ............... | F01L 3/22 29/888.061 |
| 5,848,579 A * | 12/1998 | Adachi | ............... | F01L 3/22 123/188.8 |
| 5,860,401 A * | 1/1999 | Adachi | ............... | B23K 20/023 123/188.8 |
| 5,871,141 A * | 2/1999 | Hadar | ............... | B23K 20/005 228/180.5 |
| 5,970,614 A * | 10/1999 | Adachi | ............... | F01L 3/22 29/888.061 |
| 6,138,351 A * | 10/2000 | Adachi | ............... | F01L 3/22 123/188.8 |
| 6,346,179 B1 * | 2/2002 | Makino | ............... | G01N 27/4077 204/426 |
| 6,381,842 B2 * | 5/2002 | Kato | ............... | B23K 15/04 29/888.022 |
| 6,552,292 B1 * | 4/2003 | Nomura | ............... | B23K 1/19 219/148 |
| 7,124,927 B2 * | 10/2006 | Reiber | ............... | B23K 1/0016 228/180.5 |
| 7,389,905 B2 * | 6/2008 | Reiber | ............... | B23K 20/004 228/179.1 |
| 2001/0015013 A1 * | 8/2001 | Kato | ............... | B23K 15/04 29/888.042 |
| 2007/0235495 A1 * | 10/2007 | Castaneda | ............... | B23K 20/004 228/4.5 |
| 2009/0308911 A1 * | 12/2009 | Castaneda | ............... | B23K 20/004 228/1.1 |

FOREIGN PATENT DOCUMENTS

| | | |
|---|---|---|
| JP | 0647570 A | 2/1994 |
| JP | 1085953 A | 4/1998 |
| JP | 5399206 B2 | 1/2014 |

* cited by examiner

METAL BONDED PRODUCT AND METHOD FOR PRODUCING METAL BONDED PRODUCT

TECHNICAL FIELD

The present invention relates to a metal bonded product obtained by bonding a first metal member having an opening and a cylindrical second metal member having a cylindrical portion to be press-fitted in the opening of the first metal member by plastic flow achieved by application of press-fitting and current conducting, and a method for bonding metal members or method for producing a metal bonded product.

BACKGROUND ART

As processes for bonding a ring-shaped metal component and a cylindrical metal component to each other, "ring mash bonding," "ring projection bonding," "edge ring projection bonding" and so on are known. FIGS. 5A-5C show explanatory views of conventional bonding processes. FIG. 5A is an explanatory view of a ring mash bonding process, FIG. 5B is an explanatory view of a ring projection bonding process, and FIG. 5C is an explanatory view of an edge ring projection bonding process ("RingMash" is a registered trademark in Japan).

A ring mash bonding process is a solid-phase bonding process in which a cylindrical metal member is press-fitted in an opening of a ring-shaped metal member and a current is applied to achieve bonding therebetween. As shown in FIG. 5A, a cylindrical metal member 11 has a cylindrical portion with a diameter that is slightly larger than the diameter of an opening 13 of a ring-shaped metal member 12. The cylindrical metal member 11 has an edge portion having a taper portion 14a, and the ring-shaped metal member 12 also has an edge portion having a taper portion 14b. After the taper portion 14a of the cylindrical metal member 11 and the taper portion 14b of the ring-shaped metal member 12 are brought into contact with each other, the cylindrical metal member 11 is press-fitted in the opening 13 of the ring-shaped metal member 12 by applying a pressure to the cylindrical metal member 11 and a current is applied between the cylindrical metal member 11 and the ring-shaped metal member 12, thereby causing the contact portions of the cylindrical metal member 11 and the ring-shaped metal member 12 to undergo plastic flow to achieve bonding therebetween.

A ring projection bonding process is a resistance welding process in which a current is applied to a projection provided on one of a cylindrical metal member and a ring-shaped metal member until the metal is melted to achieve bonding. As shown in FIG. 5B, a projection 15 is provided on one of the cylindrical metal member 11 and the ring-shaped metal member 12. FIG. 5B shows a case where a projection 15 is provided on the cylindrical metal member 11. The cylindrical metal member 11 and the ring-shaped metal member 12 are then pressed against each other and a current is applied until the projection 15 is melted to achieve bonding therebetween. The function of the projection 15 is to reduce the contact area between the metal members. This enables the current to be concentrated at the projection 15 for effective heat generation. This process is suitable for welding between metals with low resistance.

An edge ring projection bonding process is a resistance welding process in which an edge portion of one of a cylindrical metal member and a ring-shaped metal member is used as a projection and a current is applied to the projection until the metal is melted to achieve bonding between the cylindrical metal member and the ring-shaped metal member. As shown in FIG. 5C, the cylindrical portion of the cylindrical metal member 11 has a diameter that is slightly larger than the diameter of the opening 13 of the ring-shaped metal member 12, and the cylindrical metal member 11 has an edge portion having a taper portion 14. In addition, the edge portion of one of the cylindrical metal member 11 and the ring-shaped metal member 12 is used as a projection 15. FIG. 5C shows a case where the edge portion of the ring-shaped metal member 12 is used as a projection 15. The cylindrical metal member 11 and the ring-shaped metal member 12 are then pressed against each other to press-fit the cylindrical metal member 11 in the opening 13 of the ring-shaped metal member 12 and a current is applied to the projection 15 until it is melted to achieve bonding between the cylindrical metal member and the ring-shaped metal member.

In recent years, ring mash bonding is attracting attention as a process for bonding metals of drive system components of automobiles, and expected as a process that can replace electron beam welding and bolt joining from the standpoint of running cost, cycle time and the like. As described above, ring mash bonding is a press-fitting type bonding process characterized in that bonding depth can be increased in the axial direction and high coaxial accuracy can be easily achieved without the need for the use of a positioning jig compared to ring projection bonding.

As a modification of the ring mash bonding process, a process is known in which an inner peripheral wall portion of a first metal member and an outer peripheral wall portion of a second metal member are both formed with a stepped configuration so that two separate bonded portions can be created with a gap therebetween. With this process, a bonding structure that is strong against bending in particular can be constructed without the need for immoderately increasing the axial length of each bonding portion (bonding length), and the bonding strength can be effectively improved without increasing the bonding energy (refer to Patent Document 1, for example).

PRIOR ART DOCUMENTS

Patent Documents

Patent Document 1 Japanese Patent No. 5399206

SUMMARY OF THE INVENTION

Problem to be Solved by the Invention

It is, however, difficult to achieve high bonding strength with the process of Patent Document 1 because the contact area per portion (there are two bonded portions) cannot be large enough. The strength of a bonded portion depends on its bonding area. In the case of a press-fitting type bonding process like ring mash bonding, in particular, the relation "Bonding area=bonding diameter×bonding depth" holds, in other words, higher bonding strength can be achieved as the bonding depth is greater. Especially, when different types of metals, such as a cast iron and an alloy steel, are bonded to each other, unbonded portion becomes larger as the press-in depth increases. This fact makes it difficult to achieve sufficient effective bonding depth.

It is, therefore, an object of the present invention to provide a metal bonded product and a method for bonding metal members in which a large bonding area can be provided to achieve high bonding strength and coaxial accuracy can be easily achieved without the need for the use of a positioning jig.

Means for Solving the Problem

To solve the problem, a metal bonded product 11, 12 of the first aspect of the present invention, as shown in FIG. 1 and FIG. 3 e.g., comprises: a first metal member 12 having a circular opening 13 and having a first taper portion 16 on a side wall surface of the opening 13; and a second metal member 11 having a cylindrical portion to be press-fitted in the opening 13, wherein a second taper portion 17 is formed at an end of the cylindrical portion with the same chamfer angle as that of the first taper portion 16, the second taper portion 17 being bonded to the first taper portion 16 by applying a current between the first and second metal members 12, 11 with the cylindrical portion press-fitted in the opening 13; wherein the first taper portion 16 or the second taper portion 17 has multiple step-shaped bonding surfaces and the bonding is achieved by causing the multiple step-shaped bonding surfaces to undergo plastic flow.

While the plastic flow takes place at least in the multiple step-shaped bonding surfaces, the taper portion of the other member may also undergo plastic flow. When the taper portion of the other member undergoes plastic flow, much stronger bonding is achieved.

In the metal bonded product according to the second aspect of the present invention, the first metal member 12 may be a ring-shaped metal member having the circular opening 13 through its center.

To solve the problem, a method for producing a metal bonded product of the third aspect of the present invention, as shown in FIG. 3 e.g., comprises the steps of: providing a first metal member 12 having a circular opening 13 and having a first taper portion 16 on a side wall surface of the opening 13; providing a second metal member 11 having a cylindrical portion to be press-fitted in the opening 13, the second metal member 11 having a second taper portion 17 formed at an end of the cylindrical portion with the same chamfer angle as that of the first taper portion 16; press-fitting the cylindrical portion in the opening 13; bonding the first and second metal members 12, 11 to each other by applying a current between the first and second metal members 12, 11; wherein the first taper portion 16 or the second taper portion 17 has multiple step-shaped bonding surfaces 18 and the bonding step includes the step of causing multiple step-shaped bonding surfaces 18 to undergo plastic flow.

In the method for producing a metal bonded product according to the fourth aspect of the present invention, the first metal member 12 may be a ring-shaped metal member having the circular opening 13 through its center.

Effect of the Invention

According to the present invention, the first metal member has an opening and has a first taper portion formed on a side wall surface of the opening, and the cylindrical metal member has a cylindrical portion that is press-fitted in the opening of the first metal member and has a second taper portion formed at an end of the cylindrical portion with the same chamfer angle as that of the first taper portion of the first metal member having the opening. The first taper portion or the second taper portion has multiple step-shaped bonding surfaces, and the first metal member and the cylindrical metal member are bonding to each other by press-fitting the cylindrical portion of the cylindrical metal member in the opening of the first metal member and applying a current to cause the multiple step-shaped bonding surfaces to undergo plastic flow. Thus, because the portions to be bonded include multiple step-shaped bonding surfaces, the bonding area can be increased to achieve high bonding strength. In addition, because this is a press-fitting type bonding process in which a cylindrical portion of a cylindrical metal member is press-fitted in an opening of a first metal member, coaxial accuracy can be achieved without the need for the use of a positioning jig.

This application is based on the Patent Application No. 2014-165648 filed on Aug. 18, 2014 in Japan, the contents of which are hereby incorporated in its entirety by reference into the present application, as part thereof.

The present invention will become more fully understood from the detailed description given hereinbelow. The other applicable fields will become apparent with reference to the detailed description given hereinbelow. However, the detailed description and the specific embodiment are illustrated of desired embodiments of the present invention and are described only for the purpose of explanation. Various changes and modifications will be apparent to those ordinary skilled in the art on the basis of the detailed description.

The applicant has no intention to give to public any disclosed embodiments. Among the disclosed changes and modifications, those which may not literally fall within the scope of the patent claims constitute, therefore, a part of the present invention in the sense of doctrine of equivalents.

DETAILED DESCRIPTION OF EMBODIMENTS

Embodiments of the present invention are hereinafter described with reference to the drawings. The present invention is not limited to the following embodiments.

A metal bonded product according to an embodiment of the present invention includes a ring-shaped metal member and a cylindrical metal member, the ring-shaped metal member having a circular opening through its center, a first taper portion formed on a side wall surface of the opening and multiple step-shaped bonding surfaces formed on the first taper portion, the cylindrical metal member having a cylindrical portion that is press-fitted in the opening of the ring-shaped metal member and a second taper portion which is formed at an end of the cylindrical portion with the same chamfer angle as that of the first taper portion of the ring-shaped metal member and which is bonded to the multiple step-shaped bonding surfaces of the first taper portion of the ring-shaped metal member by plastic flow bonding achieved by applying a current with the cylindrical portion press-fitted in the opening of the ring-shaped metal member.

Figure 1:
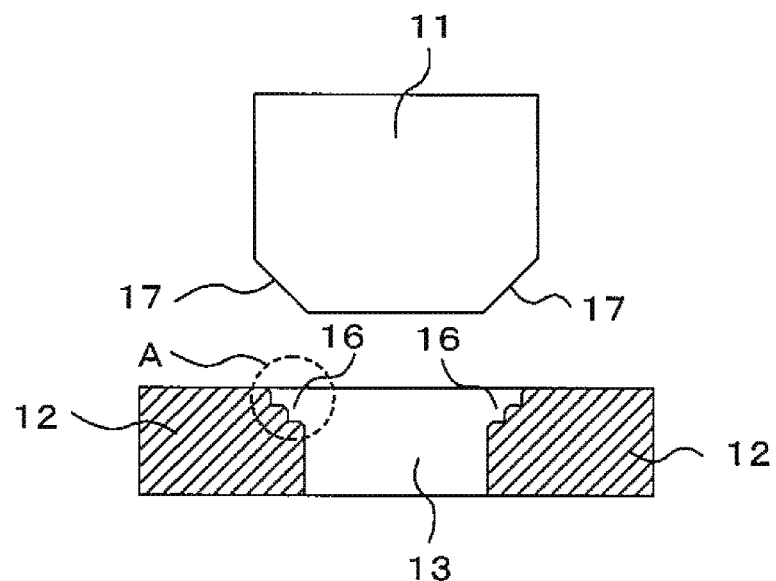
FIG. 1 is a configuration diagram of a cylindrical metal member and a ring-shaped metal member as constituent elements of a metal bonded product according to an embodiment of the present invention.

This embodiment of the present invention is described with particularity below. FIG. 1 is a configuration diagram of a cylindrical metal member and a ring-shaped metal member as constituent elements of a metal bonded product according to this embodiment of the present invention. The metal bonded product according to this embodiment of the present invention includes a cylindrical metal member 11 and a ring-shaped metal member 12 which are bonded to each other by press-fitting the cylindrical metal member 11 in an opening 13 of the ring-shaped metal member 12 while applying a current between the cylindrical metal member 11 and the ring-shaped metal member 12.

The ring-shaped metal member 12 has a circular opening 13 through its center, and a first taper portion 16 is provided on a side wall surface of the opening 13. The first taper portion 16 of the ring-shaped metal member 12 has multiple step-shaped bonding surfaces. The multiple step-shaped bonding surfaces of the first taper portion 16 are described later.

On the other hand, the cylindrical metal member 11 has a cylindrical portion that is to be press-fitted in the opening 13 of the ring-shaped metal member 12, and a second taper portion 17 with the same chamfer angle as that of the first taper portion 16 of the ring-shaped metal member 12 is formed at an end of the cylindrical portion. When the cylindrical portion of the cylindrical metal member 11 is press-fitted in the opening 13 of the ring-shaped metal member 12 and a current is applied therebetween, the second taper portion 17 of the cylindrical metal member 11 and the multiple step-shaped bonding surfaces of the first taper portion 16 of the ring-shaped metal member 12 are bonded to each other by plastic flow bonding. As a result, the metal bonded product according to an embodiment of the present invention is produced.

Figure 2:
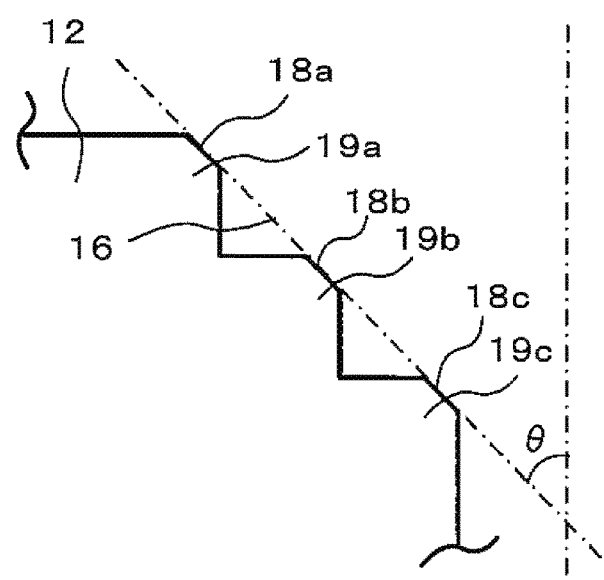
FIG. 2 is an enlarged view of multiple step-shaped bonding surfaces of a first taper portion in part A of FIG. 1.

FIG. 2 is an enlarged view of the multiple step-shaped bonding surfaces of the first taper portion 16 shown in the part A of FIG. 1. As shown in FIG. 2, a plurality of steps are provided in the form of stairs on the first taper portion 16 and the edge of each step is chamfered by the same (or simultaneous) working process to form multiple step-shaped bonding surfaces 18. While a case where the multiple step-shaped bonding surfaces 18 include three step-shaped bonding surfaces 18a, 18b and 18c is shown in FIG. 2, they may be more than three or less, i.e., two. Because a plurality of steps are formed in the form of stairs on the first taper portion 16 and the edge of each step is chamfered in the same working process, a plurality of edge projections 19a, 19b and 19c are formed in the depth direction of the opening 13 of the ring-shaped metal member 12.

The chamfered three step-shaped bonding surfaces 18a, 18b and 18c may have the same length. Alternatively, because the current concentrates more and a larger amount of heat is generated at a step located further outside during bonding, the steps may be formed longer toward outside and shorter toward inside. In this case, all the steps are allowed to generate heat uniformly. The chamfer angle θ of the first taper portion 16 is approximately 15° to 60°. When the angle θ is smaller, the inside diameter of the portion to be bonded does not decrease much downward even if the bonding depth is larger. Because the bonding diameter decreases and the bonding strength decreases as the inside diameter of the opening 13 is smaller, the angle θ is preferably not large.

The second taper portion 17 of the cylindrical metal member 11 is chamfered at the same chamfer angle as that of the ring-shaped metal member 12. Thus, when the cylindrical metal member 11 is inserted into the opening 13 of the ring-shaped metal member 12, an outer peripheral surface of the cylindrical metal member 11 contacts the multiple step-shaped bonding surfaces 18a, 18b and 18c of the ring-shaped metal member 12. As described above, the second taper portion 17 of the cylindrical metal member 11 is chamfered at the same chamfer angle as that of the multiple step-shaped bonding surfaces 18a, 18b and 18c of the ring-shaped metal member 12 so that it can contact the multiple step-shaped bonding surfaces 18a, 18b and 18c of the ring-shaped metal member 12.

In other words, the multiple step-shaped bonding surfaces 18a, 18b and 18c of the ring-shaped metal member 12 are chamfered by the same working process to reduce the angular tolerance (or difference) between the multiple step-shaped bonding surfaces 18a, 18b and 18c of the ring-shaped metal member 12 and the chamfered surface of the second taper portion 17 of the cylindrical metal member 11, whereby the contact state between a plurality of edge projections 19a, 19b and 19c and the chamfered surface of the cylindrical metal member 11 can be made as uniform as possible so that the pressure and bonding current, which are critical parameters for bonding, can be distributed uniformly.

Figure 3:
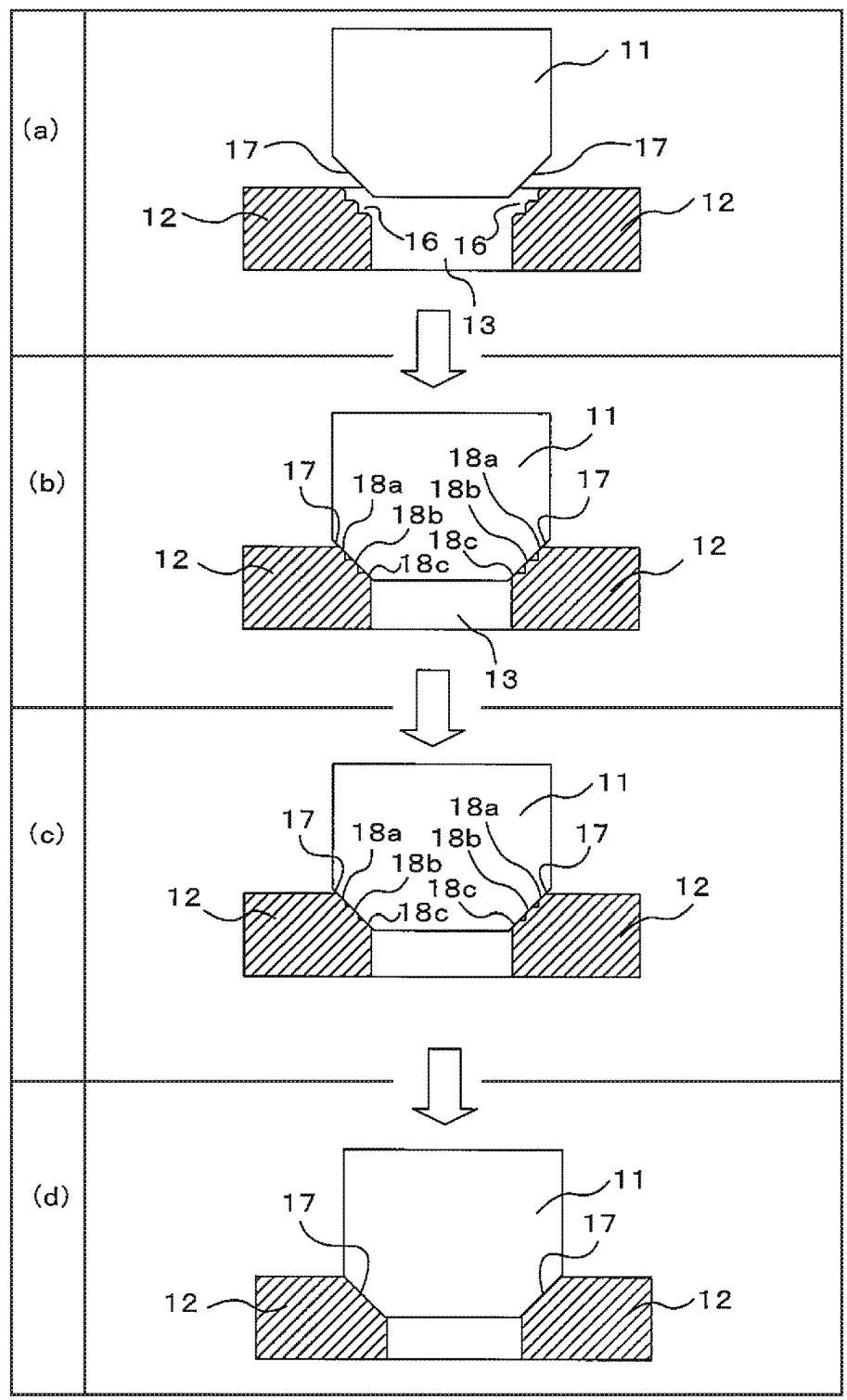
FIG. 3 is an explanatory view of a method for bonding metal members according to an embodiment of the present invention.

FIG. 3 is an explanatory view of a method for bonding metal members according to an embodiment of the present invention.

The method for bonding metal members according to this embodiment of the present invention includes providing a ring-shaped metal member and a cylindrical metal member, the ring-shaped metal member having a circular opening through its center and having a first taper portion formed on a side wall surface of the opening and multiple step-shaped bonding surfaces formed on the first taper portion, the cylindrical metal member having a cylindrical portion that is to be press-fitted in the opening of the ring-shaped metal member and a second taper portion formed at an end of the cylindrical portion with the same chamfer angle as that of the first taper portion of the ring-shaped metal member, and bonding the ring-shaped metal member and the cylindrical metal member by press-fitting the cylindrical portion of the cylindrical metal member in the opening of the ring-shaped metal member while applying a current to cause the side wall portion of the cylindrical portion of the cylindrical metal member and the multiple step-shaped bonding surfaces of the first taper portion to undergo plastic flow.

More specifically, the goal of the method is to obtain a metal bonded product by press-fitting the cylindrical metal member 11 shown in FIG. 1 in the opening 13 of the ring-shaped metal member 12 while applying a current between the metal members to achieve bonding therebetween.

As shown in FIG. 3(a), the cylindrical portion of the cylindrical metal member 11 is positioned in an upper part of the opening 13 of the ring-shaped metal member 12, and as shown in FIG. 3(b), the cylindrical portion of the cylindrical metal member 11 is moved down to the position of the opening 13 of the ring-shaped metal member 12 to bring the second taper portion 17 of the cylindrical portion of the cylindrical metal member 11 into contact with the first taper portion 16 of the ring-shaped metal member 12. Because the first taper portion 16 and the second taper portion 17 have the same chamfer angle as described above, the second taper portion 17 of the cylindrical metal member 11 contacts the multiple step-shaped bonding surfaces 18a, 18b and 18c of the ring-shaped metal member 12.

In the state shown in FIG. 3(b) a pressure is applied to the cylindrical portion of the cylindrical metal member 11 and a current is applied between the cylindrical metal member 11 and the ring-shaped metal member 12. This causes a plurality of edge projections formed of the multiple step-shaped bonding surfaces 18a, 18b and 18c to undergo plastic flow as shown in FIG. 3(c).

Figure 4:
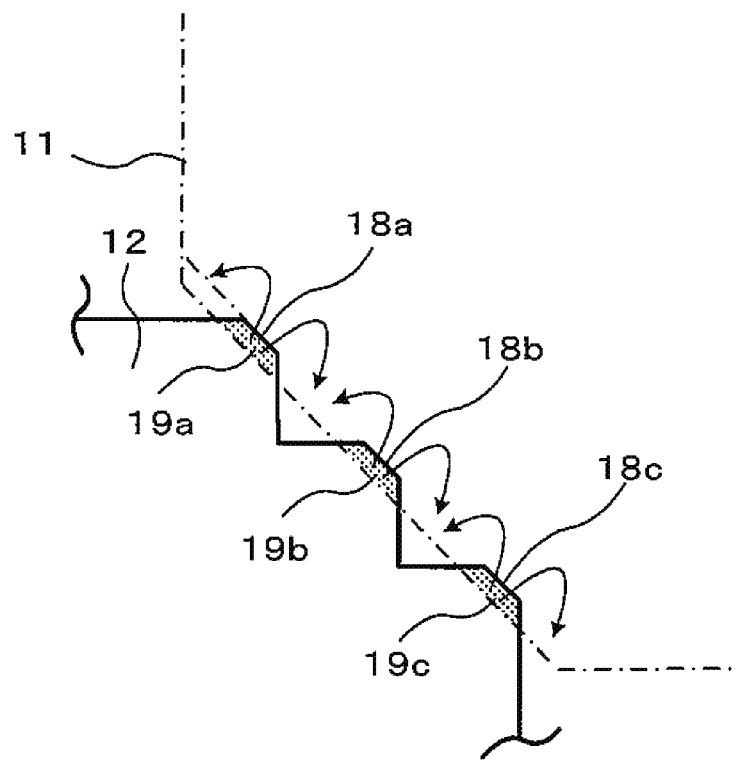
FIG. 4 is an explanatory view of a state where a plurality of edge projections formed of the multiple step-shaped bonding surfaces undergo plastic flow.
Figure 5A:
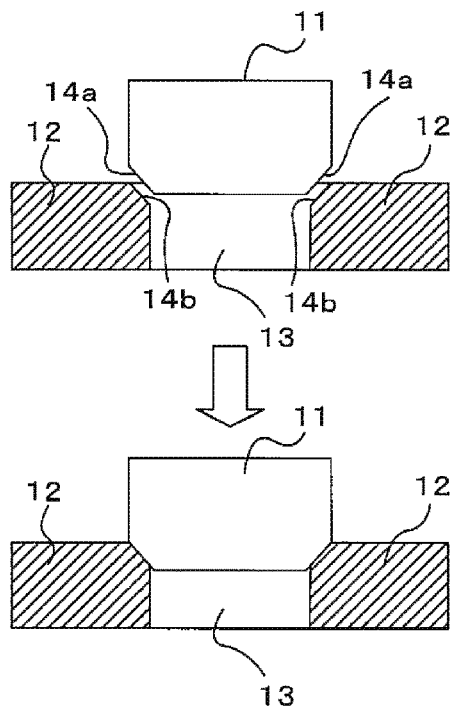
FIGS. 5A-5C are explanatory views of conventional bonding processes.
Figure 5B:
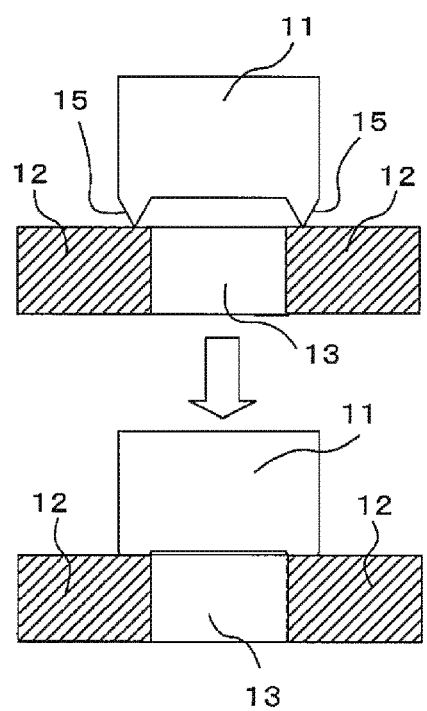
Figure 5C:
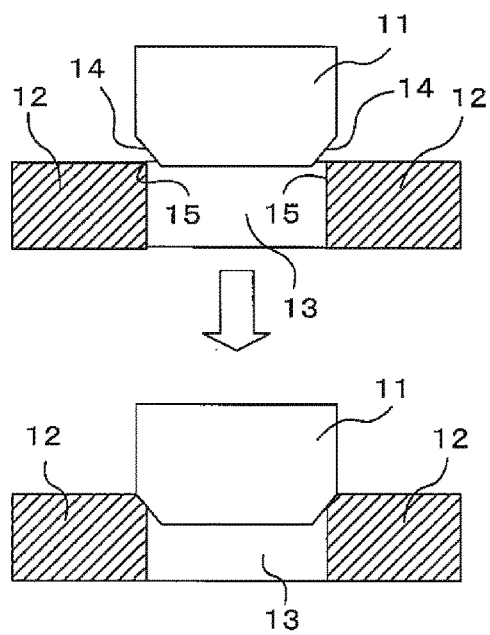

FIG. 4 is an explanatory view of a state where a plurality of edge projections 19a, 19b and 19c formed of the multiple step-shaped bonding surfaces 18a, 18b and 18c undergo plastic flow. A plurality of edge projections 19a, 19b and 19c undergo plastic flow, and the edge projections 19a, 19b and 19c that have undergone plastic flow onto the stair-like steps fill the spaces therebetween as indicated by arrows. In this way, the ring-shaped metal member 12 and the cylindrical metal member 11 are bonded to each other to obtain a metal bonded product as shown in FIG. 3(d).

As described above, the method for bonding metal members according to an embodiment of the present invention is not a process in which one of the members is pressed deeply into the other unlike ring mash bonding. Because the press-in depth is sufficient if only the edge projections 19a, 19b and 19c are crushed, large displacement is not necessary in bonding. As described above, when different types of metals, such as a cast iron and an alloy steel, are bonded to each other, unbonded portion becomes larger as the push-in depth is larger. However, the press-in depth is sufficient if only the edge projections 19a, 19b and 19c are crushed, and this method is suitable for bonding different types of metals, such as a cast iron and an alloy steel. It should be noted that the bonding depth can be increased by increasing the number of edge projections 19.

In addition, because chamfered surfaces are utilized in bonding, coaxial accuracy can be easily achieved between the cylindrical metal member 11 and the ring-shaped metal member 12 without the need for the use of a positioning jig. Further, because the push-in depth is limited by the height of the edge projections 19, height accuracy after bonding can be easily obtained.

As described above, in this embodiment of the present invention, because multiple step-shaped bonding surfaces 18a, 18b and 18c are provided in the depth direction of the opening 13 of the ring-shaped metal member 12 so that heat can be generated at a number of points, bonding can be efficiently achieved.

As described above, according to this embodiment of the present invention, the ring-shaped metal member has an opening and has a first taper portion formed on a side wall surface of the opening and having multiple step-shaped bonding surfaces formed thereon, and the cylindrical metal member has a cylindrical portion that is press-fitted in the opening of the ring-shaped metal member and has a second taper portion formed at an end of the cylindrical portion with the same chamfer angle as that of the first taper portion of the ring-shaped metal member having the opening. The ring-shaped metal member and the cylindrical metal member are bonding to each other by press-fitting the cylindrical portion of the cylindrical metal member in the opening of the ring-shaped metal member while applying a current to cause the side wall portion of the cylindrical portion of the cylindrical metal member and the multiple step-shaped bonding surfaces of the first taper portion to undergo plastic flow. Thus, because the portions to be bonded include multiple step-shaped bonding surfaces, the bonding area can be larger to achieve high bonding strength. In addition, because this is a press-fitting type bonding process in which a cylindrical portion of a cylindrical metal member is press-fitted in an opening of a ring-shaped metal member, coaxial accuracy can be achieved without the need for the use of a positioning jig.

The multiple step-shaped bonding surfaces, which are described as being formed on the first taper portion in the above embodiments, may be formed on the second taper portion, not on the first taper portion. In this case, the multiple step-shaped bonding surfaces and the taper portion function in the same manner as in the case where the multiple step-shaped bonding surfaces are formed on the first taper portion. In addition, the first metal member, which is described as being a circular ring-shaped metal member 12 with an opening 13 through its center, may be a metal member with a different shape such as rectangle. The circular opening 13, which is typically formed through the center of the metal member, may be formed at a position offset from its center as needed.

While some embodiments of the present invention have been described, these embodiments are shown for illustrative purposes and are not intended to limit the scope of the invention. These novel embodiments can be implemented in various different forms, and various omissions, replacements and modifications can be made thereto without departing from the gist of the invention. These embodiments and their modifications are included in the scope and gist of the invention as well as in the scope of the invention described in the claims and their equivalents.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

EXPLANATION OF REFERENCE NUMERALS

11: cylindrical metal member, 12: ring-shaped metal member, 13: opening, 14: taper portion, 15: projection, 16: first taper portion, 17: second taper portion, 18: bonding surface, 19: edge projection

The invention claimed is:

1. A method for producing a metal bonded product, comprising the steps of:
    providing a first metal member having a circular opening and having a first taper portion on a side wall surface of the opening;
    providing a second metal member having a cylindrical portion to be press-fitted in the opening, the second metal member having a second taper portion formed at an end of the cylindrical portion with a same chamfer angle as a chamfer angle of the first taper portion;
    press-fitting the cylindrical portion in the opening;
    bonding the first and second metal members to each other by applying a current between the first and second metal members;
    wherein the first taper portion or the second taper portion has multiple step-shaped bonding surfaces and the bonding step includes the step of causing multiple step-shaped bonding surfaces, an edge of each step of the multiple step-shaped bonding surfaces is chamfered, to undergo plastic flow.

2. The method for producing a metal bonded product according to claim 1, wherein the first metal member is a ring-shaped metal member having the circular opening through its center.

3. The method for producing a metal bonded product according to claim 1, wherein the chamfer angle of the first taper portion, the chamfer angle of the second taper portion and a chamfer angle of the edge are approximately 15° to 60°.

4. The method for producing a metal bonded product according to claim 3, wherein the first metal member is a ring-shaped metal member having the circular opening through its center.

* * * * *